US008828514B2

(12) United States Patent
Fukumoto et al.

(10) Patent No.: US 8,828,514 B2

(45) Date of Patent: Sep. 9, 2014

(54) FLUORORESIN TUBE AND ROTARY MEMBER FOR FIXING DEVICE

(75) Inventors: Yasuhiro Fukumoto, Sennan-gun (JP); Hong-Phuc Nguyen, Sennan-gun (JP)

(73) Assignee: Sumitomo Electric Fine Polymer, Inc., Sennan-gun, Osaka (JP)

(*) Notice: Subject to any disclaimer, the term of this patent is extended or adjusted under 35 U.S.C. 154(b) by 68 days.

(21) Appl. No.: 13/579,388

(22) PCT Filed: Dec. 22, 2010

(86) PCT No.: PCT/JP2010/073094

§ 371 (c)(1), (2), (4) Date: Aug. 16, 2012

(87) PCT Pub. No.: WO2011/104987

PCT Pub. Date: Sep. 1, 2011

(65) Prior Publication Data

US 2012/0315068 A1 Dec. 13, 2012

(30) Foreign Application Priority Data

Feb. 26, 2010 (JP) ................................ 2010-041176

(51) Int. Cl.
*B32B 1/08* (2006.01)
*G03G 15/20* (2006.01)

(52) U.S. Cl.
USPC .......................... 428/36.9; 428/35.7; 399/333

(58) Field of Classification Search
CPC .. B32B 1/08; G03G 15/2053; G03G 15/2057; G03G 2215/2048
USPC .................. 428/35.7, 36.9; 393/333; 399/333
See application file for complete search history.

(56) References Cited

U.S. PATENT DOCUMENTS 6,132,815 A * 10/2000 Takahashi et al. ............ 427/553
2004/0224245 A1* 11/2004 Shigezaki et al. .............. 430/66

FOREIGN PATENT DOCUMENTS

JP S48-34969 A 5/1973
JP 63-213880 9/1988
JP H11-80387 A 3/1999
JP 2003-162129 A 6/2003
JP 2003-211542 7/2003
JP 2005-99519 4/2005
JP 2008-200954 9/2008
JP 2009-186617 8/2009

OTHER PUBLICATIONS

Machine Translation of JP 2008-200954 (Sep. 2008).*

(Continued)

*Primary Examiner* — Erik Kashnikow

(74) *Attorney, Agent, or Firm* — Drinker Biddle & Reath LLP

(57) ABSTRACT

Provided are a fluororesin tube that has substantially no scratches formed during manufacturing, and a rotary member for a fixing device, the rotary member obtained by using the fluororesin tube. The fluororesin tube is a heat-shrinkable fluororesin tube that covers a rotary member for a fixing device, such as a fixing roller or a pressure roller, to form an outermost layer of the rotary member, wherein a maximum depth of a linear scratch on a surface of the fluororesin tube is 0.8 μm or less. In one embodiment, the length of the linear scratch is 1 mm or less, and the thickness of the fluororesin tube is 100 μm or less.

3 Claims, 4 Drawing Sheets

(56) References Cited

OTHER PUBLICATIONS

Notification of Reasons for Rejection dated Jan. 17, 2012 from Japanese patent application No. 2011-039340 (with attached partial English-language translation).

Examiner's Decision of Refusal dated Sep. 4, 2012 from Japanese patent application No. 2011-039340 (with attached partial English-language translation).

U.S. Office Action dated Feb. 11, 2013 that issued in U.S. Appl. No. 13/353,980 including Double Patenting Rejections on pp. 2-3.

* cited by examiner

A

B

A

B

FLUORORESIN TUBE AND ROTARY MEMBER FOR FIXING DEVICE

TECHNICAL FIELD

The present invention relates to a heat-shrinkable fluororesin tube that covers a rotary member for a fixing device in an image-forming apparatus such as a copy machine, a printer, or a facsimile, and to a rotary member for a fixing device, the rotary member obtained by using the fluororesin tube.

BACKGROUND ART

In an image-forming apparatus, a fixing device heats and presses a toner image that has been transferred to a transfer-receiving material such as paper or a synthetic resin sheet, thereby fixing the toner image on the transfer-receiving material. A rotary member such as a roller or a belt is used in this fixing. For example, heating is performed while a transfer-receiving material is caused to pass between a fixing roller and a pressure roller that is in contact with the fixing roller under pressure. Unfixed toner is thereby melted and fixed on the transfer-receiving material. The rotary member for a fixing device, such as a fixing roller or a fixing belt, or a pressure roller or a pressure belt, requires (1) a toner releasing property, (2) a thermal conductive property, and (3) durability.

In order to ensure these properties, a fluororesin layer is formed as an outermost layer of the rotary member for a fixing device. PTL 1 describes that a surface of a pressure belt obtained by using a thermosetting polyimide tube is covered with a heat-shrinkable tetrafluoroethylene/perfluoroalkylvinylether copolymer (PFA) tube to form a fluororesin layer.

Heat shrinkability is imparted to a fluororesin tube by stretching the tube at least in the radial direction. An example of a method for stretching a tube includes continuously feeding an unstretched tube in a stretching pipe, inflating the tube by applying an internal pressure to the tube, and bringing the inflated tube into contact with the inner wall of the stretching pipe to regulate the inflated diameter of the tube.

CITATION LIST

Patent Literature

PTL 1: Japanese Unexamined Patent Application Publication No. 2008-200954

SUMMARY OF INVENTION

Technical Problem

Heat-shrinkable fluororesin tubes in the related art have, on the inner and outer surfaces thereof, scratches and traces of rubbing formed by being rubbed with a fixing member such as a stretching pipe or a guide plate during manufacturing of the fluororesin tubes. Such scratches including traces of rubbing may cause cracking and splitting of the tubes. In particular, in the case where a tube has a small wall thickness, the tube is easily torn by the scratches, and thus it is difficult to manufacture such a tube. Furthermore, even if such scratches become substantially invisible after thermal shrinkage or baking of the tube, the scratches may cause cracking and splitting during covering of a rotary member for a fixing device with the tube or during practical use of the rotary member. In the case where the tube is used in a rotary member for a fixing device, degradation of an image may occur.

In order to solve the above problem, the present invention provides a fluororesin tube in which scratches that become a cause of cracking and splitting are suppressed, and a rotary member for a fixing device, the rotary member obtained by using the fluororesin tube.

Solution to Problem

According to an aspect of the present invention, there is provided a heat-shrinkable fluororesin tube that covers a rotary member for a fixing device of an image-forming apparatus to form an outermost layer of the rotary member, wherein a maximum depth of a linear scratch on a surface of the fluororesin tube is 0.8 μm or less.

According to this fluororesin tube, a maximum depth of a linear scratch is 0.8 μm or less, and the fluororesin tube has substantially no scratches formed during manufacturing. Therefore, cracking and splitting of the fluororesin tube are not easily caused during manufacturing of the fluororesin tube, during covering of a rotary member for a fixing device with the fluororesin tube, and during practical use of the rotary member. Accordingly, in the case where a rotary member for a fixing device is covered with this fluororesin tube to form a fluororesin layer functioning as an outermost layer, a satisfactory image can be obtained by the rotary member for the fixing device.

The depth of a linear scratch can be represented as a depth determined using, as a reference, a circumferential line constituting the outer surface of the fluororesin tube. In the case where one or a plurality of linear scratches are formed on a surface of a fluororesin tube, the maximum depth of the one or the plurality of linear scratches is referred to as "a maximum depth of a linear scratch". By using the maximum depth as a reference, scratches that become a cause of cracking and splitting can be satisfactorily evaluated.

The rotary member for a fixing device may include a cylindrical or columnar rigid base or an endless belt-type flexible base. The cylindrical or columnar rigid base is, for example, a formed body composed of a metal or a ceramic. The endless belt-type flexible base is a formed body composed of a metal or a resin.

In the fluororesin tube, a maximum length of the linear scratch is preferably 1 mm or less. If the surface of the tube is rubbed with a fixing member during manufacturing, the length of at least one of scratches exceeds 1 mm. Since the fluororesin tube has no such a scratch, the generation of cracking and splitting of the fluororesin tube can be suppressed.

The fluororesin tube has a thickness (average thickness) of, for example, 100 μm or less, preferably 5 μm or more and 50 μm or less, and more preferably 5 μm or more and 20 μm or less. Even in the case of a tube having such a small wall thickness, tearing or the like due to a scratch does not occur.

According to another aspect of the present invention, there is provided a rotary member for a fixing device of an image-forming apparatus, the rotary member being obtained by using the fluororesin tube described above. This rotary member for a fixing device includes the fluororesin tube in which scratches that become a cause of cracking and splitting are suppressed, and thus a satisfactory image can be obtained.

Advantageous Effects of Invention

According to the present invention, a fluororesin tube has substantially no scratches formed during manufacturing. Consequently, the generation of cracking and splitting can be suppressed during manufacturing of the tube, during covering of a rotary member for a fixing device with the tube, and during practical use of the rotary member for a fixing device.

DESCRIPTION OF EMBODIMENTS

Figure 1:
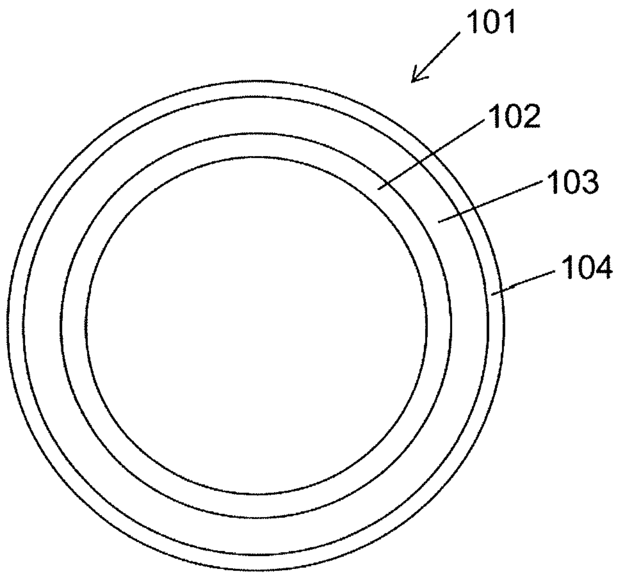
FIG. 1 is a view showing an example of a rotary member for a fixing device, the rotary member being covered with a fluororesin tube.

A fluororesin tube of the present invention is a heat-shrinkable tube for covering a rotary member for a fixing device of an image-forming apparatus. A cylindrical or columnar formed body or an endless belt (also referred to as "seamless belt")-type formed body can be used as a base of the rotary member for a fixing device.

The cylindrical or columnar formed body (rigid base) is composed of for example, a metal having a high thermal conductive property, such as aluminum, an aluminum alloy, iron, or stainless steel; or a ceramic such as alumina or silicon carbide. The inside of the formed body may be hollow or solid depending on the intended use. The cylindrical or columnar formed body may have a shaft shape having a bearing portion at each end thereof. A cylindrical or columnar formed body composed of a metal is generally called a cored bar.

The endless belt-type formed body (flexible base) is a tube composed of a metal or a heat-resistant resin. Examples of the metal tube include iron, nickel, and alloys thereof. In the case where an electromagnetic induction heating method is used for heating a fixing belt, the material of the metal tube is preferably iron, nickel, an alloy thereof, ferrite stainless steel, or the like. As in the case of a fixing belt, in the case where it is necessary to efficiently heat a whole belt member, a nickel belt or a stainless steel belt, which has a small heat capacity and which can be more rapidly heated up by electromagnetic induction heating, is preferably used as the metal tube.

The heat-resistant resin tube is preferably composed of a material that has a small heat capacity and that is rapidly heated up by being heated with a heater at the time of use. In general, a heat-resistant resin having a heat-resistant temperature, such as a melting point, a heat distortion temperature, or a thermal decomposition temperature, of 250° C. or higher is used as the material of the heat-resistant resin tube.

Specific examples of the heat-resistant resin include polyimide, polyamide-imide, polyether ether ketone, polyphenylenesulfide, and polybenzimidazole. Among these resins, from the standpoint of heat resistance and durability, polyimide, polyamide-imide, and polybenzimidazole are preferable, polyimide is more preferable, and thermosetting polyimide is particularly preferable.

The thermosetting polyimide can be obtained by applying a polyimide precursor (also referred to as "polyamide acid" or "polyamic acid") varnish onto an outer surface of a columnar metal mold or a cylindrical metal mold, drying the varnish, and then curing the varnish by heating. Alternatively, a tube may be formed by applying a polyimide precursor varnish onto an inner surface of a cylindrical metal mold. Examples of the application method include, but are not particularly limited to, a method for forming a coating film having a desired thickness, the method including applying a polyimide precursor varnish onto an outer surface of a metal mold, and then causing a die having an inner diameter larger than the outer diameter of the metal mold to pass outside the metal mold.

After the polyimide precursor varnish is dried, the resulting polyimide precursor tube is cured by heating in a state where the polyimide precursor tube is caused to adhere to the surface of the metal mold. Alternatively, after the polyimide precursor varnish is dried, the resulting polyimide precursor tube is detached from the metal mold at the time when the strength of the polyimide precursor tube is increased to the extent that the tube can maintain the structure as a tubular product, and then cured by heating. By heating the polyimide precursor to a maximum temperature of 350° C. to 450° C., the polyamide acid is subjected to dehydration ring-closure, and converted to polyimide.

From the standpoint of heat resistance, mechanical strength, etc., the thermosetting polyimide is preferably a condensation-type wholly aromatic polyimide. An example of the thermosetting polyimide tube is obtained by performing a polymerization reaction between an acid dianhydride such as pyromellitic dianhydride, 3,3',4,4'-diphenyltetracarboxylic dianhydride, or oxydiphthalic dianhydride and a diamine such as 4,4'-diaminodiphenyl ether, p-phenylenediamine, or 4,4'-diaminobenzanilide in an organic solvent to synthesize a polyimide precursor, forming a tube using an organic solvent solution (varnish) of the polyimide precursor, and then heating the tube to perform dehydration ring-closure of the polyimide precursor. As such a polyimide varnish, commercially available products may be used besides varnishes that are specially synthesized.

The heat-resistant resin tube may contain an inorganic filler, an electrically conductive filler such as carbon, carbon nanotubes (CNTs), or graphite, or a metal filler, as required. Examples of the inorganic filler include silica, alumina, silicon carbide, boron carbide, titanium carbide, tungsten carbide, silicon nitride, boron nitride, aluminum nitride, mica, potassium titanate, barium titanate, calcium carbonate, magnesium oxide, zirconium oxide, and talc. Among these, from the standpoint of high thermal conductivity, alumina, silicon carbide, boron carbide, and boron nitride are preferable. In the case where an inorganic filler is incorporated in the heat-resistant resin tube, the inorganic filler is used in a proportion of usually 50% by volume or less, and 40% by volume or less in many cases. The lower limit of the amount of inorganic filler is 5% by volume in many cases.

The thickness, the diameter, the length, etc. of the base of the rotary member for a fixing device, e.g., a fixing belt, a fixing roller, a pressure belt, or a pressure roller are appropriately selected. The length of the rotary member is determined in accordance with the width of a transfer-receiving material. The diameter φ of the rotary member is generally selected from a range of 10 to 150 mm, preferably 13 to 100 mm, and more preferably 15 to 40 mm in many cases. In the case of a fixing belt, the thickness of the rotary member is generally selected from the range of 20 to 100 μm, and preferably 25 to 80 μm.

Examples of the material of the fluororesin tube include tetrafluoroethylene/perfluoroalkylvinylether copolymers (PFA), tetrafluoroethylene/hexafluoropropylene copolymers (FEP), polytetrafluoroethylene (PTFE), ethylene/tetrafluoroethylene copolymers (ETFE), polychlorotrifluoroethylene (PCTFE), ethylene/chlorotrifluoroethylene copolymers (ECTFE), and polyvinylidene fluoride (PVDF). Among these resins, PFA is preferable from the standpoint of, for example, extrusion moldability, heat resistance, and a toner releasing property.

For example, various commercially available products such as 350-J, HP series, e.g., 451HP-J, 950HP, and 950HP-Plus, and PF-059, all of which are manufactured by Du Pont-Mitsui Fluorochemicals Co., Ltd. can be used as PFA.

The thickness (average thickness) of the fluororesin tube is, for example, 100 μm or less, preferably 5 μm or more and 50 μm or less, and more preferably 5 μm or more and 20 μm or less. The length of the fluororesin tube may be appropriately determined in accordance with the length of the base. In many cases, the length of the fluororesin tube after shrinking is preferably determined so that about 5 to 10 mm of each end of the base is exposed.

Heat shrinkability is imparted to the fluororesin tube by inflating a tube formed by extrusion to stretch the tube at least in the radial direction. An outer circumferential surface of a rotary member for a fixing device is covered with this heat-shrinkable tube, and the rotary member is heated to a crystallization temperature or higher in this state, thereby fusion-bonding the fluororesin tube to the outer circumferential surface. For example, the crystallization temperature of 950HP-Plus manufactured by Du Pont Kabushiki Kaisha is 270° C. When the temperature reaches 270° C., PFA molecules are in a semi-molten state and bonded to a primer containing a fluororesin. This tube is an extruded product, and thus a molecular orientation due to the extrusion strongly remains in the axial direction. Accordingly, cracks may be formed in the orientation direction in some operating environments. In such a case, the oriented state can be relaxed by reheating (rebaking) the tube to the melting point or higher. Alternatively, in the step of first heating, the tube may be heated to the melting point or higher so that bonding to the primer and relaxation of the orientation are performed at the same time. By fusion-bonding this fluororesin tube, a fluororesin layer is formed as an outermost layer of the rotary member for a fixing device. The stretching ratio can be appropriately determined in accordance with a desired heat-shrinkage ratio. For example, the stretching ratio is 1.02 to 2.0, and preferably 1.03 to 1.3 in both the axial direction and the radial direction.

FIG. 1 is a view showing an example of a rotary member for a fixing device, the rotary member being covered with a fluororesin tube. The rotary member for a fixing device according to this example is a rubber roller used as a fixing roller. FIG. 1 shows a cross section of the rubber roller. A rubber roller 101 includes a roller base 102, a rubber layer 103 formed on the roller base 102, and a fluororesin layer 104 formed as an outermost layer. An adhesive layer may be provided between the layers using a primer suitable for the respective layers, but the adhesive layer is omitted in the figure. The fluororesin layer 104 is formed by covering the outer circumferential surface of the rubber layer 103 with a fluororesin tube, and conducting heating in this state, thereby thermally fusion-bonding the fluororesin tube to the outer circumferential surface.

The material of the rubber layer is preferably a heat-resistant rubber having heat resistance to withstand continuous use at a fixing temperature. Preferable examples of the heat-resistant rubber include silicone rubbers and fluororubbers. These heat-resistant rubbers may be used alone or in combination of two or more. The rubber layer may be a single layer composed of a silicone rubber or a fluororubber. Alternatively, for example, the rubber layer may be a laminate including a silicone rubber layer and a fluororubber layer.

The heat-resistant rubber is preferably milable, a liquid silicone rubber, a fluororubber, or a mixture thereof from the standpoint of excellent heat resistance. Specific examples thereof include silicone rubbers such as dimethyl silicone rubber, fluorosilicone rubber, methylphenyl silicone rubber, and vinyl silicone rubber; and fluororubbers such as vinylidene fluoride rubber, tetrafluoroethylene-propylene rubber, tetrafluoroethylene-perfluoromethylvinylether rubber, phosphazene-based fluororubber, and fluoropolyether. These rubbers may be used alone or in combination of two or more. A silicone rubber and a fluororubber may be blended.

Among these, liquid silicone rubbers and fluororubbers are preferable because a rubber layer having a high thermal conductivity can be easily formed by adding a large amount of thermal conductive filler. Examples of the liquid silicone rubbers include condensation-type liquid silicone rubbers and addition-type silicone rubbers. Among these, addition-type silicone rubbers are preferable.

Addition-type silicone rubbers use a mechanism in which siloxane chains are cross-linked by conducting an addition reaction between a polysiloxane having a vinyl group and a polysiloxane having a Si—H bond in the presence of a platinum catalyst. The curing rate can be appropriately changed by changing the type or the amount of platinum catalyst used or by using a reaction inhibitor (retardant). A two-component addition-type liquid silicone rubber that is rapidly cured at room temperature is referred to as a room-temperature curing liquid silicone rubber. A two-component addition-type liquid silicone rubber whose heat-curing temperature is controlled to be in the range of 100° C. to 200° C. by adjusting the amount of platinum catalyst or by using a reaction inhibitor is referred to as a heat-curing liquid silicone rubber. The inhibitory actions may be further enhanced so that a one-component composition prepared by mixing two components maintains a liquid state as long as the composition is stored at a low temperature, and is turned into a rubbery state when cured by heating before use. Such a one-component addition-type liquid silicone rubber obtained as described above is referred to as a one-component heat-curing liquid silicone rubber. Among these addition-type liquid silicone rubbers, the one-component addition-type liquid silicone rubber is preferable from the standpoint of the ease of mixing with a thermally conductive filler, the ease of the formation of a rubber layer, adhesiveness between layers, etc.

The thermal conductivity of the rubber layer can be increased by incorporating a thermally conductive filler. In the case of a fixing roller (or a fixing belt), the thermal conductivity of the rubber layer is generally 0.6 to 4.0 W/(m·K), preferably 0.9 to 3.0 W/(m·K), and more preferably 1.0 to 2.5 W/(m·K). In the case where a rubber layer having a particularly high thermal conductivity is required, the thermal conductivity of the rubber layer is preferably 1.1 W/(m·K) or more, and more preferably 1.2 W/(m·K) or more.

In order to increase the thermal conductivity of the rubber layer, it is preferable to employ a method of forming a rubber layer using a rubber composition prepared by mixing a thermally conductive filler with at least one heat-resistant rubber selected from the group consisting of silicone rubbers and fluororubbers. When the thermal conductivity of the rubber layer is excessively low and the rubber layer is used as a fixing roller (or a fixing belt), the heating efficiency decreases, and it is difficult to sufficiently improve fixability in high-speed printing or full-color printing. When the thermal conductivity of the rubber layer is excessively high, the mechanical strength and elasticity of the rubber layer may decrease because the mixing ratio of the thermally conductive filler is excessively high.

Examples of the thermally conductive filler include electrically insulating inorganic fillers such as silicon carbide, boron nitride, alumina, aluminum nitride, potassium titanate, mica, silica, titanium oxide, talc, and calcium carbonate. These thermally conductive fillers may be used alone or in combination of two or more. Among these thermally conductive fillers, silicon carbide, boron nitride, alumina, and aluminum nitride are preferable. A metal powder such as a silicon powder, carbon, carbon nanotubes, graphite, or the like may also be used as the filler.

The mixing ratio of the thermally conductive filler in the rubber composition is usually 5% to 60% by volume, preferably 10% to 50% by volume, and more preferably 15% to 45% by volume on a whole composition basis. When the amount of thermally conductive filler added is excessively small, it becomes difficult to sufficiently increase the thermal conductivity of the rubber layer. When the amount of thermally conductive filler added is excessively large, the mechanical strength and elasticity of the rubber layer tend to decrease.

The rubber composition containing a thermally conductive filler may be prepared by mixing the thermally conductive filler with a rubber material. Alternatively, a commercially available composition may be used as required. An example of such a commercially available composition is a one-component liquid silicone rubber containing a thermally conductive filler such as silicon carbide (manufactured by Shin-Etsu Chemical Co., Ltd., X32-2020).

The thickness of the rubber layer is usually 10 μm or more and 5 mm or less, preferably 50 μm or more and 800 μm or less, and particularly preferably 100 μm or more and 500 μm or less. In many cases, a thickness of 150 μm or more and 350 μm or less can provide satisfactory results. In the case where a roller is used as a base, since the base is hard, the thickness of the rubber layer is preferably 50 μm or more and 5 mm or less, and more preferably 100 μm or more and 1 mm or less. In the case where a belt is used as a base, considering the elasticity of the base itself, the thickness of the rubber layer is preferably 10 μm or more and 1 mm or less, more preferably 50 to 900 μm, and particularly preferably 100 to 800 p.m. In many cases, a thickness in the range of 200 to 350 μm can provide satisfactory results.

In the case of a fixing roller (or a fixing belt), a hardness of the rubber layer is preferably low in order to impart elasticity. The hardness of the rubber layer (hardness determined by the spring-type hardness test A, specified in JIS K6301) is preferably less than 90°, more preferably 10° to 70°, still more preferably 10° to 50°, and particularly preferably 20° to 40°.

When the thickness of the rubber layer is excessively small or the hardness of the rubber layer is excessively high, the fixing roller (or a fixing belt) cannot melt unfixed toner in such a manner that the fixing roller (or a fixing belt) wraps the unfixed toner, resulting in a decrease in fixability. In particular, in the case where a color toner is used, fixing failure tends to occur. When the thickness of the rubber layer is excessively large or the hardness of the rubber layer is excessively low, a problem in terms of durability may occur.

By covering the outer circumferential surface of a rubber roller including such a rubber layer with a fluororesin tube, a fluororesin layer can be formed as an outermost layer of the rubber roller. The fluororesin tube of the present invention can be applied not only to a rubber roller but also to, for example, a fixing belt having a three-layer structure in which a fluororesin layer is formed on the outer circumferential surface of the above-described thermosetting polyimide tube with an adhesive layer therebetween.

Figure 2:
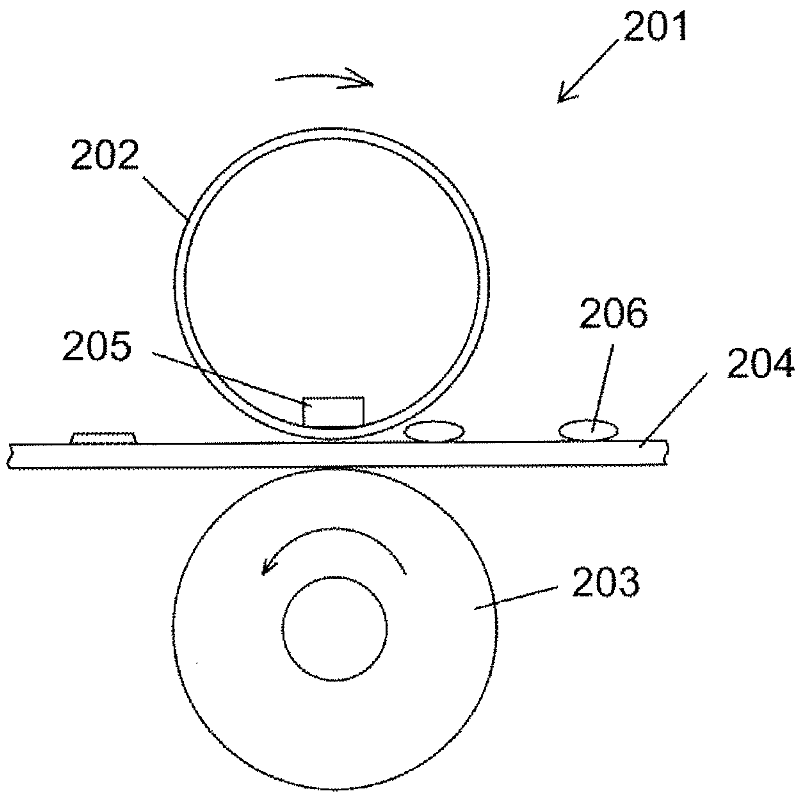
FIG. 2 is a view showing a schematic structure of a fixing device including a fixing belt having a two-layer structure.

FIG. 2 is a view showing a schematic structure of a fixing device including a fixing belt having a three-layer structure. A fixing device 201 includes a thin fixing belt 202 that is rotatably supported. As described above, a metal tube can be used as the fixing belt 202 besides an endless belt-shaped thermosetting polyimide tube. The fixing belt 202 and a pressure roller 203 are in contact with each other under pressure so as to nip a transporting route of a transfer-receiving material 204. A heater 205 is arranged inside a nip portion of the fixing belt 202. Since only the thin fixing belt 202 is disposed between the heater 205 and the transfer-receiving material 204, heat generated from the heater 205 is substantially directly transferred to an unfixed toner 206 on the transfer-receiving material 204. Therefore, the warming-up time can be made extremely short. The rubber roller described with reference to FIG. 1 can be used as the pressure roller 203. As for both the fixing belt 202 and the pressure roller 203, a fluororesin layer can be formed as the outermost layer by covering the fixing belt 202 or the pressure roller 203 with the fluororesin tube of the present invention. An outer circumferential surface of a thermosetting polyimide tube, a metal tube, or a rubber layer is covered with a fluororesin tube, and heating is conducted in this state so as to thermally shrink the fluororesin tube. Thus, the fluororesin tube is thermally fusion-bonded to the outer circumferential surface.

Figure 3:
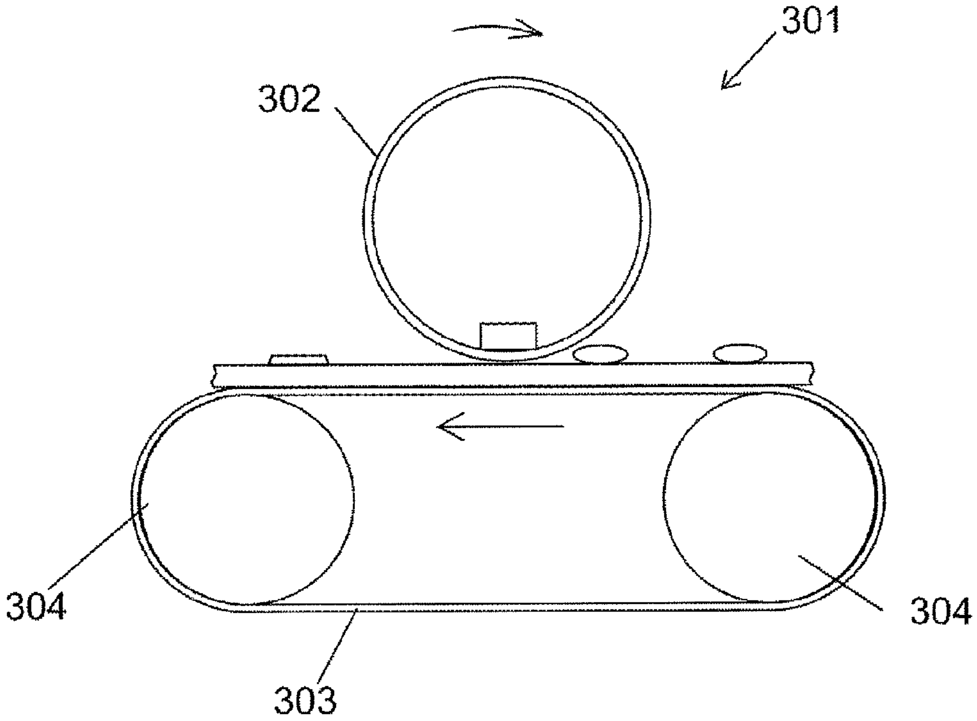
FIG. 3 is a view showing a schematic structure of a fixing device including a fixing belt and a pressure belt.

FIG. 3 is a view showing a schematic structure of a fixing device including a fixing belt and a pressure belt. A fixing device 301 includes a fixing belt 302 as in the example shown in FIG. 2, and further includes a pressure belt 303 instead of the pressure roller. An endless belt-shaped pressure belt 303 is rotatably stretched around two rollers 304, and is in contact with the fixing belt 302 under pressure. The fluororesin tube of the present invention can also be used in order to form a fluororesin layer functioning as the outermost layer of the pressure belt in this fixing device 301. An outer circumferential surface of a thermosetting polyimide tube or a metal tube is covered with a fluororesin tube, and heating is conducted in this state so as to thermally shrink the fluororesin tube. Thus, the fluororesin tube is thermally fusion-bonded to the outer circumferential surface.

The heat-shrinkage ratio of the fluororesin tube is usually 3% to 15%, and preferably 5% to 10% when measured after a sample is left to stand in a thermostatic chamber (in a dry atmosphere) at 150° C. for 30 minutes. For example, a sample prepared by cutting a fluororesin tube in the axial direction and in the circumferential direction so as to have a size of 10 cm square can be used as the measurement sample. In the case where a sample having a size of 10 cm square cannot be prepared, the heat-shrinkage ratio in the axial direction may be evaluated by using a sample prepared by cutting a tube so as to have a length of 10 cm in the axial direction, and the heat-shrinkage ratio in the radial direction may be evaluated by measuring a change in the lay-flat width.

The inner diameter of the fluororesin tube is adjusted so as to be larger by usually 0.5% to 5%, and preferably 1% to 3% than the outer diameter of an object to be covered. When the ratio of the inner diameter of the fluororesin tube to the outer diameter of the object to be covered is excessively small, it is difficult to smoothly cover the object with the fluororesin tube. On the other hand, when the ratio is excessively large, although the workability of covering becomes relatively good, fusion bondability to the object to be covered tends to decrease and defects such as unevenness and wrinkles tend to be formed on the resulting covering layer after thermal shrinkage and fusion bonding.

In the fluororesin tube of the present invention, a depth of a linear scratch on the surface of the tube is 0.8 μm at most.

When the maximum depth of a linear scratch formed on the surface of the fluororesin tube is 0.8 μm or less, it is possible to suppress the generation of cracking and splitting of the tube due to the scratch. In order to sufficiently suppress the generation of cracking and splitting over the entire surface of the fluororesin tube, it is necessary that the resin tube have no linear scratches or the depths of all linear scratches be suppressed to 0.8 μm or less.

A linear scratch extends in a direction tilted by an angle of, for example, 20° at the maximum with respect to the axial direction of the fluororesin tube. This tilt may be determined by linear approximation of the linear scratch. The length of the linear scratch is preferably 1 mm or less at least at the time of the manufacturing. These measurements can be performed by using an optical microscope. In particular, a linear scratch which becomes a cause of cracking and splitting of a tube is a scratch formed when a surface of the fluororesin tube is rubbed with a fixing member or a regulation member that regulates the outer diameter of the fluororesin tube before and after the inflation of the fluororesin tube. This scratch is formed not in the circumferential direction of the tube but in a direction parallel to the axial direction of the tube or in a direction slightly tilted by an angle with respect to the axial direction. Furthermore, scratches are formed on the surface of the tube, which is continuously fed, over the substantially entire length of the tube, and the length of each of the scratches exceeds 1 mm. In addition to these scratches, scratches may be formed on the surface of the fluororesin tube during polishing, etc. In general, a linear scratch extending in the axial direction is not formed by polishing because the polishing is performed in the circumferential direction of the tube.

Figure 4:
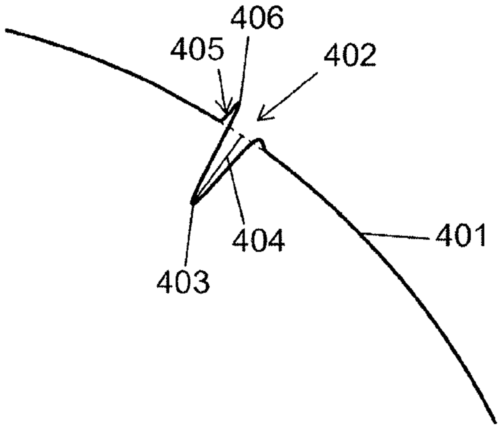
FIG. 4 is a view illustrating a depth of a linear scratch of a fluororesin tube.

FIG. 4 is a view illustrating a depth of a linear scratch of a fluororesin tube. FIG. 4 illustrates a part of a cross-sectional curve based on a circumferential line 401 constituting the outer circumferential surface of the tube, and one linear scratch 402 is formed in the part. The depth of the linear scratch 402 can be measured as a depth 404 from the circumferential line 401 to a deepest portion 403 of the scratch 402. Even if a portion 405 projecting from the circumferential line 401 is formed at the time of the formation of the scratch, the depth of the linear scratch 402 is represented not by a depth from a top 406 of the portion to the deepest portion 403 but by the depth from the circumferential line 401 to the deepest portion 403. By using the circumferential line 401 as a reference, it is possible to evaluate a scratch which becomes a cause of cracking and splitting of the tube. In the case where a single linear scratch 402 is formed on the surface of the fluororesin tube, the depth of the linear scratch 402 is defined as the maximum depth. In the case where a plurality of linear scratches 402 are formed on the surface of the fluororesin tube, among the depths of the linear scratches 402, the maximum value is defined as the maximum depth.

This fluororesin tube can be stretched by, for example, two methods. One of the methods is a batch method in which an unstretched tube is arranged in a pipe, and is inflated by applying an internal pressure to the tube. Another method is a method in which a tube inflated by sending air inside the tube is pinched with two pairs of pinch rollers, thereby filling the tube with air, and the distance between the pairs of pinch rollers is decreased to increase the internal pressure of the tube, thereby inflating the tube. In these methods, the surface of the inflated fluororesin tube is not rubbed with a fixing member. In the latter method, both ends of the tube are pinched by the pinch rollers. However, since the tube is fed by the pinch rollers, the surface of the tube is not rubbed. Even when a reel is used in a path of the tube as required, the surface of the tube is not rubbed because the reel is also rotated together. Scratches are also not formed on the inner surface of the tube. Consequently, it is possible to obtain a fluororesin tube in which, even if a linear scratch is present on the surface, the maximum depth of the linear scratch is 0.8 μm or less.

Figure 5:
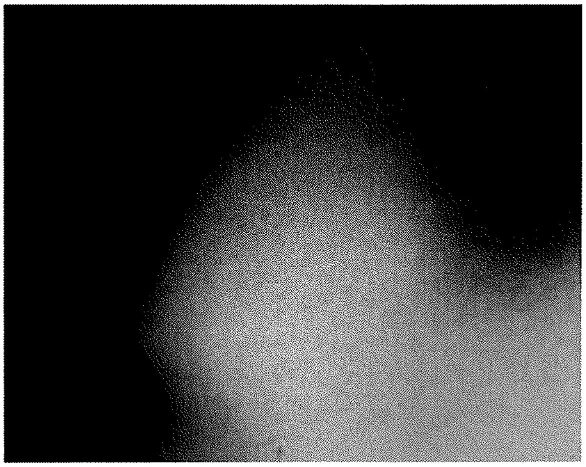
FIG. 5 includes photographs each showing a surface state of a heat-shrinkable PFA tube stretched using two pairs of pinch rollers.
Figure 5:
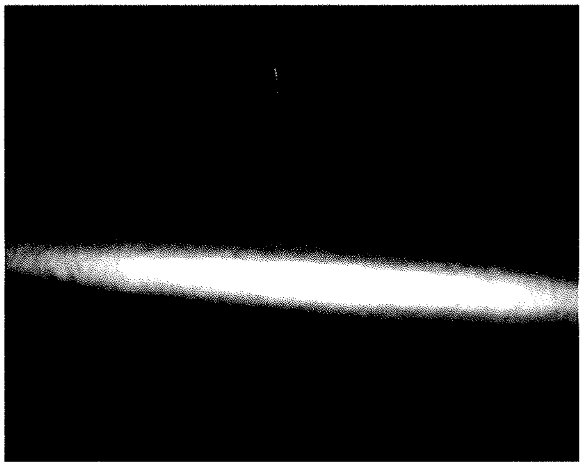
Figure 6:
FIG. 6 includes photographs each showing a surface state of a PFA tube in the related art.
Figure 6:
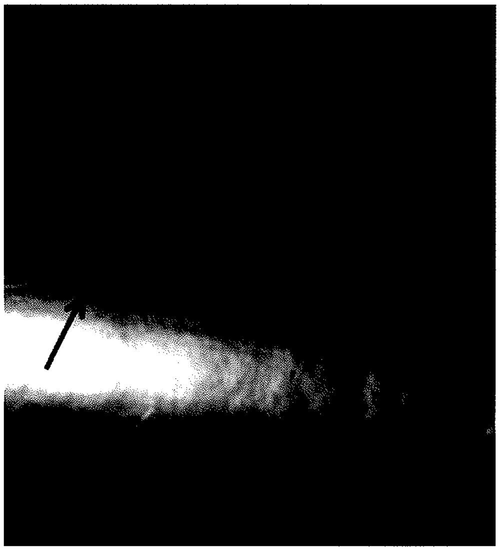

FIG. 5 includes photographs each showing a surface state of a heat-shrinkable PFA tube stretched using two pairs of pinch rollers. The image of this surface state was taken at a magnification of 20 with an optical microscope. FIG. 5A shows a surface state of a manufactured PFA tube, and FIG. 5B shows a surface state of a PFA tube that covers a rubber roller. In FIGS. 5A and B, the horizontal direction corresponds to the axial direction of the tube, and the vertical direction corresponds to the circumferential direction of the tube. As shown in FIG. 5A, no linear scratches are observed on the surface of the manufactured PFA tube. As shown in FIG. 5B, no linear scratches are observed on the surface of the PFA tube even after a rubber roller is covered with the PFA tube. Accordingly, in the case where this PFA tube is used in a rotary member for a fixing device, cracking and splitting of the fluororesin layer do not tend to occur, and a satisfactory image can be stably obtained for a long period of time FIG. 6 includes photographs each showing a surface state of a PFA tube in the related art. FIG. 6A shows a surface state of a PFA tube in the related art before use, and FIG. 6B shows a surface state of a PFA tube in the related art that covers a rubber roller. In FIGS. 6A and B, the horizontal direction corresponds to the axial direction of the tube, and the vertical direction corresponds to the circumferential direction of the tube. As shown by the arrows in FIG. 6A, in the PFA tube in the related art, a linear scratch formed during stretching extends in the horizontal direction. The depth of the linear scratch exceeds 0.8 μm, and the length thereof significantly exceeds 1 mm. As shown in FIG. 6B, the linear scratch remains even after covering. That is, a deep scratch is inherently present, even if the scratch becomes substantially invisible after shrinking. In this state, cracking and splitting may occur during use of a rotary member for a fixing device, and degradation of the image quality may also be caused.

The embodiments described above do not limit the technical scope of the present invention, and various modifications and applications can be made within the scope of the present invention.

INDUSTRIAL APPLICABILITY

As described above, a fluororesin tube and a rotary member for a fixing device of the present invention have substantially no linear scratches which may easily cause cracking and splitting, and can be widely used in various image-forming apparatuses such as a copy machine, a printer, and a facsimile.

REFERENCE SIGNS LIST

101 rubber roller
102 roller base
103 rubber layer
104 fluororesin layer
201, 301 fixing device
202, 302 fixing belt
203 pressure roller
204 transfer-receiving material
205 heater
206 unfixed toner
303 pressure belt
304 pressure roller
401 circumferential line

402 linear scratch
403 deepest portion of linear scratch
404 depth of linear scratch
405 projecting portion of linear scratch
406 top of projecting portion of linear scratch

The invention claimed is:

1. A heat-shrinkable fluororesin tube that covers a rotary member for a fixing device of an image-forming apparatus to form an outermost layer of the rotary member, wherein one or more linear scratch is present on a surface of the fluororesin tube, wherein a maximum depth of the one or more linear scratch on the surface of the fluororesin tube is 0.8 μm or less, and, in the case of a plurality of linear scratches being present on the surface of the fluororesin tube the depths of each of the plurality of linear scratches is suppressed to 0.8 μm or less so that no linear scratch has a depth of more than 0.8 μm;

the fluororesin is a tetrafluoroethylene/perfluoroalkylvinylether copolymer (PFA);

a maximum length of the linear scratch is 1 mm or less;

the fluororesin tube has a thickness of 100 μm or less;

the linear scratch extends in a direction tilted by an angle of 20° at the maximum with respect to the axial direction of the fluororesin tube; and the fluororesin tube is obtained by the method in which a tube inflated by sending air inside the tube is pinched with two pairs of pinch rollers, thereby filling the tube with air, and the distance between the pairs of pinch rollers is decreased to increase the internal pressure of the tube, thereby inflating the tube, and a surface of the inflated fluororesin tube is not rubbed with a fixing member.

2. The fluororesin tube according to claim 1, wherein the rotary member for a fixing device includes a cylindrical or columnar rigid base or an endless belt-type flexible base.

3. A rotary member for a fixing device of an image-forming apparatus, the rotary member comprising an outermost layer formed by using the fluororesin tube according to claim 1.

* * * * *